(12) United States Patent
Lee et al.

(10) Patent No.: US 12,261,514 B2
(45) Date of Patent: Mar. 25, 2025

(54) ZERO STANDBY POWER SYSTEM

(71) Applicant: POWER LSI CO., LTD., Daejeon (KR)

(72) Inventors: Won Tae Lee, Bucheon-si (KR); Won Ji Lee, Daejeon (KR); Chuen Sik Jung, Suwon-si (KR); Gyu Won Lee, Guri-si (KR)

(73) Assignee: POWER LSI CO., LTD., Daejeon (KR)

( * ) Notice: Subject to any disclaimer, the term of this patent is extended or adjusted under 35 U.S.C. 154(b) by 21 days.

(21) Appl. No.: 18/467,774

(22) Filed: Sep. 15, 2023

(65) Prior Publication Data

US 2024/0186881 A1 Jun. 6, 2024

(30) Foreign Application Priority Data

Dec. 2, 2022 (KR) .......................... 10-2022-0167039

(51) Int. Cl.
*H02M 1/00* (2007.01)

(52) U.S. Cl.
CPC ............................... *H02M 1/0032* (2021.05)

(58) Field of Classification Search
None
See application file for complete search history.

(56) References Cited

U.S. PATENT DOCUMENTS

| 9,350,253 | B1 * | 5/2016 | Zielger | .................. H05B 47/20 |
| 11,513,459 | B2 * | 11/2022 | Choi | ...................... G03G 15/80 |
| 2024/0154538 | A1 * | 5/2024 | Lee | .......................... H02M 1/08 |

FOREIGN PATENT DOCUMENTS

| JP | 2016194927 A | 11/2016 |
| KR | 20100021921 A | 2/2010 |
| KR | 20180001305 A | 1/2018 |

* cited by examiner

*Primary Examiner* — Jeffrey S Zweizig
(74) *Attorney, Agent, or Firm* — Novick, Kim & Lee, Pllc; Jae Youn Kim (57) ABSTRACT

An embodiment of the present disclosure provides a zero standby power system, comprising a power supply device comprising a plurality of power stages and a zero standby power device configured to receive an on/off signal and to control connections respectively to the plurality of power stages based on the received on/off signal, wherein the zero standby power device may comprise an on/off controller configured to be maintained to be in an operation state and to receive an on/off signal at an arbitrary time point.

12 Claims, 11 Drawing Sheets

ZERO STANDBY POWER SYSTEM

CROSS REFERENCE TO RELATED APPLICATION

This application claims priority to Korea Patent Application No. 10-2022-0167039 filed on Dec. 2, 2022, which is hereby incorporated by reference in its entirety.

BACKGROUND

1. Field of Technology

The present disclosure relates to a power system.

2. Related Technology

In order to drive a load in a conventional power supply device, it is necessary to always maintain an on/off controller in an operation state so that the on/off controller may receive an on/off signal inputted from an external device. However, in order for the on/off controller to maintain the operation state, VDD power is required and in order to generate the VDD power, all power stages and controllers from a first side to a second side need to be in the operation state. Accordingly, conventional power supply devices consume considerable unnecessary standby power.

The discussions in this section are only to provide background information and do not constitute an admission of prior art.

SUMMARY

To solve the aforementioned problem, the present disclosure provides a zero standby power system in which an on/off controller is disposed on a first side.

An embodiment of the present disclosure provides a zero standby power system comprising a power supply device comprising a plurality of power stages and a zero standby power device to receive an on/off signal and to control connections respectively to the plurality of power stages based on the received on/off signal, wherein the zero standby power device may comprise an on/off controller configured to be maintained in an operation state and to receive an on/off signal at an arbitrary time point.

According to an embodiment, the power supply device may further comprise an input power source connected to the zero standby power device and the zero standby power device may control a connection to the input power source based on an on/off signal so that electric energy from the input power source may be transferred respectively to the plurality of power stages.

According to an embodiment, the input power source may comprise at least one of an alternating current line power source or a direct current power source.

According to an embodiment, in a case when the input power source is an alternating current line power source, the zero standby power device may be supplied with electric energy through a rectifier.

According to an embodiment, the zero standby power device may further comprise a zero standby power controller circuit and the on/off controller may comprise a first micro controller unit (MCU) to receive an on/off signal from a wireless remote controller.

According to an embodiment, in response to the first micro controller unit receiving an on/off signal, the on/off controller may transmit an RMT_ON signal to the zero standby power controller circuit and the RMT_ON signal may be a basis of controlling connections respectively to a plurality of power stages.

According to an embodiment, the zero standby power device may further comprise a zero standby power controller circuit and, in response to the reception of an on/off signal, the on/off controller may transmit an RMT_ON signal to the zero standby power controller circuit and the RMT_ON signal may be a basis of controlling connections respectively to a plurality of power stages.

According to an embodiment, the zero standby power device may further comprise a second micro controller unit to receive an RMT_ON signal.

According to an embodiment, the zero standby power system may further comprise a load, which is driven by electric energy transmitted from the power supply device through a transformer, and an isolation driver connected with the transformer and an on/off signal may be transmitted to the zero standby power device through the isolation driver.

According to an embodiment, the zero standby power system may further comprise a load controller to control operation of the load and the zero standby power device may further comprise a zero standby power controller circuit, wherein the zero standby power controller circuit may receive an on/off signal including wakeup timing information from the load controller through the isolation driver.

According to an embodiment, the zero standby power controller circuit may control connections respectively to a plurality of power stages at a predetermined time point according to the wakeup timing information.

According to an embodiment, the zero standby power controller circuit may further comprise a real time clock (RTC) and a third micro controller unit to receive an on/off signal including wakeup timing information.

According to an embodiment, the zero standby power device may further comprise a VSU regulator to obtain electric energy used for controlling connections to the zero standby power controller circuit and respectively to a plurality of power stages.

According to an embodiment, when the VSU regulator is in a normal operation mode, VSU power in the VSU regulator associated with electric energy may be regulated to be a voltage with a predetermined level by the zero standby power controller circuit.

According to an embodiment, the voltage with a predetermined level may be determined based on at least one of a resistance in the VSU regulator and a reference voltage in the zero standby power controller circuit.

According to an embodiment, in a case when a plurality of power stages are in an operation state under the control of the zero standby power device, an auxiliary power source is formed by the plurality of power stages and, when a voltage of the VSU power in the VSU regulator is lower than a voltage of the auxiliary power source, the zero standby power controller circuit may change a source, from which electric energy is obtained, from the VSU regulator to the auxiliary power source.

According to an embodiment, a connection between each of a plurality of power stages and the zero standby power device may be made through a relay switch.

According to an embodiment, the zero standby power device may further comprise a zero standby power controller circuit and timings, where a plurality of power stages are respectively changed to be in an operation state, may be determined based on one or more capacitors connected to the zero standby power controller circuit.

According to an embodiment, the zero standby power device may further comprise a zero standby power controller circuit and timings, where a plurality of power stages are respectively changed to be in an operation state, may be determined based on input of a reference into the zero standby power controller circuit and at least one of reference voltages.

According to some embodiments of the present disclosure, it is not necessary to maintain the on/off controller to be in the operation state, and thus, the consumption of standby power of the system may be considerably reduced.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF EMBODIMENTS

Hereinafter, some embodiments of the present disclosure will be described in detail with reference to the accompanying drawings. In describing the present disclosure, a detailed description of a well-known configuration or function related the present disclosure, which may obscure the subject matter of the present disclosure, will be omitted.

With regard to the reference numerals of the components of the respective drawings, it should be noted that the same reference numerals are assigned to the same components even though they are shown in different drawings. In addition, in describing embodiments, overlapping descriptions of the same or corresponding components may be omitted. However, even if descriptions of such components are omitted, it does not mean that these components are not included in a certain embodiment.

Advantages and characteristics of the present disclosure and a method for achieving them will be clear by referring to embodiments described below with reference to the accompanying drawings. However, the present disclosure is not limited to the below-described embodiments, but may be implemented in various forms. The present embodiments are provided only for completing the present disclosure and for letting a person skilled in the art completely know the scope of the invention.

Terms used in this specification will be simply described and the embodiments will be described in detail. For the present specification, currently widely used general terms are selected by considering their functions in the present disclosure, however, these terms may be changed depending on the intentions of a technician who works in the relevant field, precedent cases, or the appearance of a new technology. In addition, in a certain case, there may be terms arbitrarily selected by the applicant, and in such a case, their meanings will be described in detail in the relevant description of the invention. Therefore, the terms used in the present disclosure need to be defined not by their simple names, but based on the meanings of the terms and the contents all throughout the present disclosure.

In this specification, a term in a singular form may also mean a term in a plural form as long as there is no particular indication. In addition, a term in a plural form may also mean a term in a singular form as long as there is no particular indication. Throughout this specification, when describing that a certain part 'comprises' a certain component, this does not mean that this certain part excludes another component, but this means that this certain part may further comprise another component as long as there is no contrary description.

Figure 1:
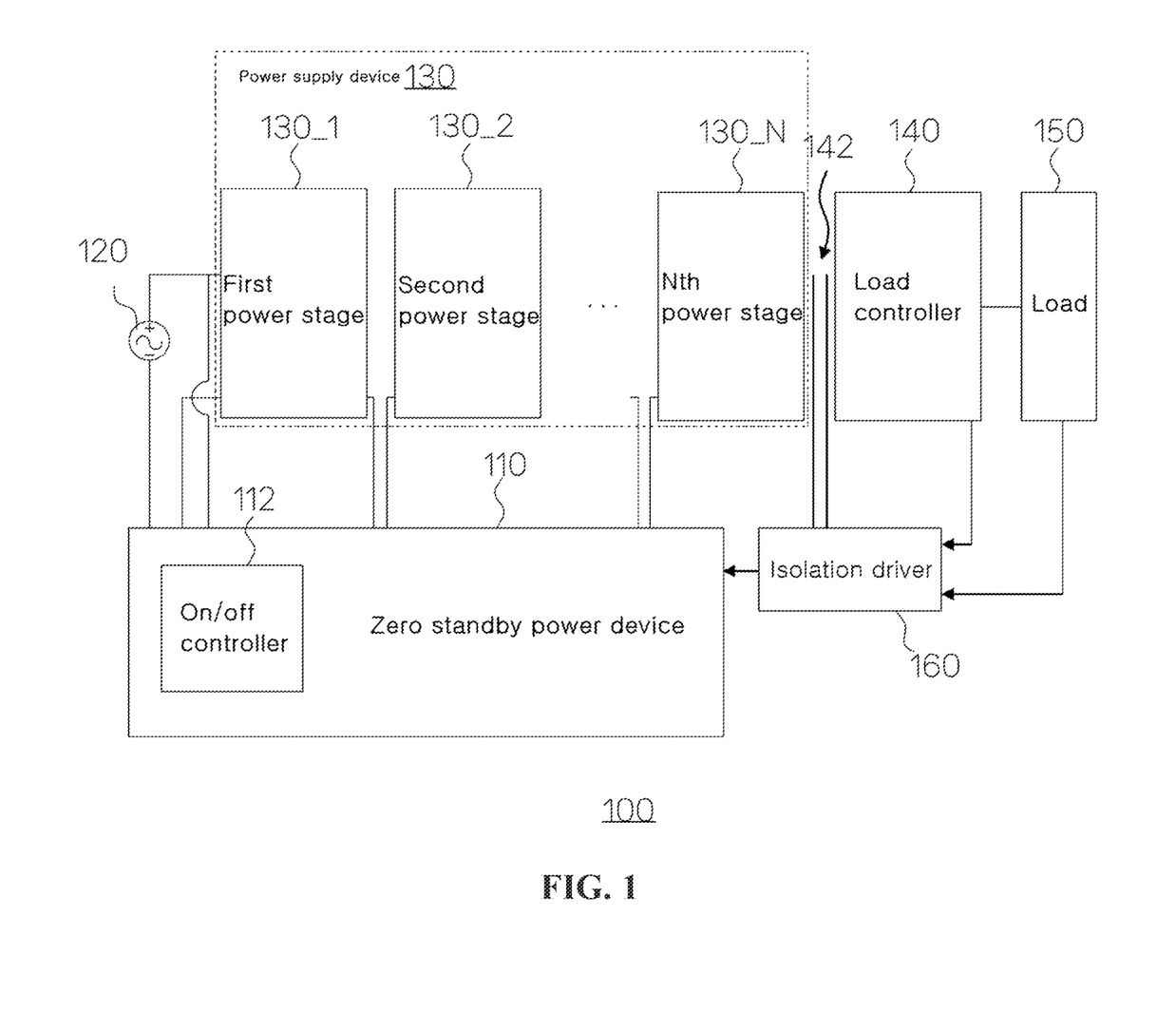
FIG. 1 is a configuration diagram of a zero standby power system according to an embodiment of the present disclosure.

FIG. 1 is a configuration diagram of a zero standby power system 100 (a 'system', hereinafter) according to an embodiment of the present disclosure. As illustrated, the system 100 may comprise at least one of a zero standby power device 110, an input power source 120, and a power supply device 130. Additionally, the system 100 may comprise at least one of a load controller 140, a load 150, and an isolation driver 160.

The system 100 may be a system for processing an on/off signal received from an external device for a drive of the load 150. Here, the load may mean a component driven by electric energy (example: a main board) included in a TV, an air conditioner, an electric cleaner, or the like. The on/off signal may mean a signal received from a wireless remote controller (not shown) connected with the system 100 and/or a signal received through a user interface (example: power switch) included in the system 100.

The power supply device 130 may comprise a plurality of power stages 130_1 to 130_N. For example, the plurality of power stages 130_1 to 130_N comprising at least one of an alternating current power rectifier, a power factor correction (PFC) circuit, and an LLC converter. In this case, the plurality of power stages 130_1 to 130_N may be electrically connected respectively to the zero standby power device 110 as shown in FIG. 1.

The zero standby power device 110 may receive the on/off signal. Specifically, the zero standby power device 110 may receive the on/off signal through an on/off controller 112. Then, the zero standby power device 110 may control connections respectively to the plurality of power stages 130_1 to 130_N based on the received on/off signal. For example, the zero standby power device 110 may start electric connections to the plurality of power stages 130_1 to 130_N based on the on/off signal. Here, the plurality of power stages 130_1 to 130_N may be changed to be in an operation state, in which they are supplied with electric energy from the input power source 120. For another example, the zero standby power device 110 may release the connections to the plurality of power stages 130_1 to 130_N based on the on/off signal.

The on/off controller 112 may be maintained in an operation state. Specifically, the on/off controller 112 may be maintained in a state in which it may receive the on/off signal from an external device. Here, being maintained in an operation state and/or being maintained in a state capable of reception of the on/off signal may mean that the on/off controller 112 is maintained in a state in which it is continuously supplied with power.

The load controller 140 may control the operation of the load 150. Specifically, the load controller 140 may change the power supply device 130 to supply power to the load 150 in an operation state by transmitting an on/off signal to the on/off controller 112 through the isolation driver 160. Here, the on/off signal transmitted by the load controller 140 may indicate wakeup timing information that the zero standby power device 110 re-drive the power supply device 130 at a time, which has been previously settled by a user when the power supply device 130 was in an operation state. A detailed description in this regard will be made below with reference to FIG. 6.

Meanwhile, an area of the system 100 including the zero standby power device 110, the input power source 120 and the power supply device 130 may be referred to as a 'first side'. In the same manner, an area of the system 100 including the load controller 140 and the load 150 may be referred to as a 'second side'. The first side and the second side may be electrically connected with each other through a transformer 142. In this case, signals, information and/or data generated in the second side may be transmitted to the first side through the isolation driver 160 connected with the transformer 142.

Figure 2:
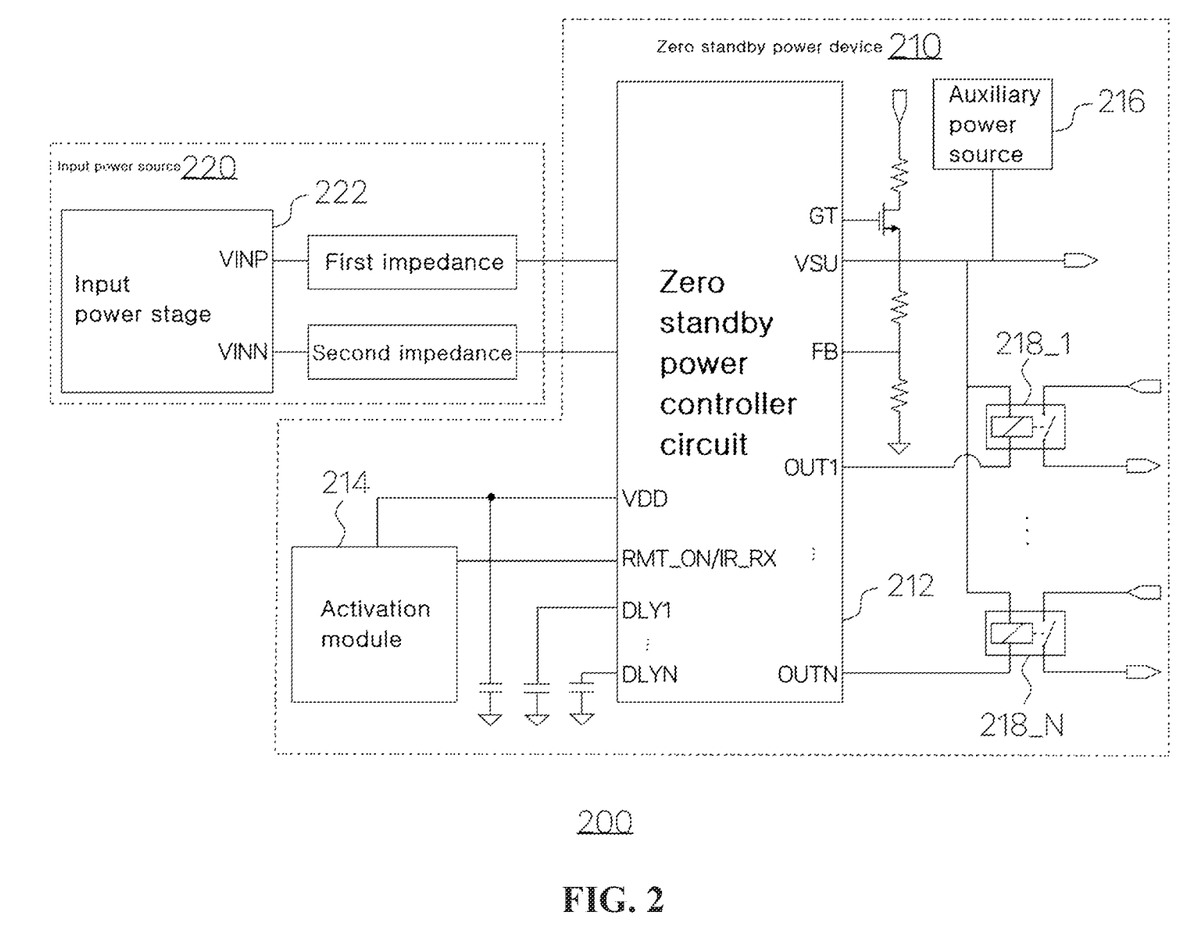
FIG. 2 is a block diagram showing another example of a zero standby power system according to an embodiment of the present disclosure.

FIG. 2 is a block diagram showing another example of a zero standby power system 200 (a 'system', hereinafter) according to an embodiment of the present disclosure. As illustrated, the system 200 may comprise a zero standby power device 210 and an input power source 220. The zero standby power device 210 and the input power source 220 may respectively correspond to the zero standby power device and the input power source in FIG. 1.

The zero standby power device 210 may comprise at least one of a zero standby power controller circuit, an activation module 214, and an auxiliary power source 216. Here, the zero standby power controller circuit 212, which is an integrated circuit, may be a circuit to output signals for controlling the auxiliary power source 216 and/or a plurality of switches 218_1 to 218_N based on data inputted by the activation module 214.

The plurality of switches 218_1 to 218_N may indicate devices for controlling power supplies respectively to the plurality of power stages (example: the plurality of power stages 130_1 to 130_N). For example, the plurality of switches 218_1 to 218_N may respectively comprise relay switches. In this case, a node of one side of a relay switch may be connected to the zero standby power controller circuit 212 and a node of the other side thereof may be connected to a power stage (not shown).

The auxiliary power source 216 may indicate a power source formed by a plurality of power stages. The auxiliary power source 216 may be prepared in order to supply electric power to the plurality of switches 218_1 to 218N in a specific circumstance. The specific circumstance may indicate, for example, a circumstance where a reduction of power consumption in the system 200 is required. A detailed description in this regard will be made below with reference to FIG. 8.

The input power source 220 may comprise an input power stage 222. Here, the input power stage 222 may indicate a circuit comprising a power source. Additionally, the input power stage 222 may further comprise a rectifier depending on types of electric power. Examples of the input power stage 222 may be described below with reference to FIG. 3.

Figure 3:
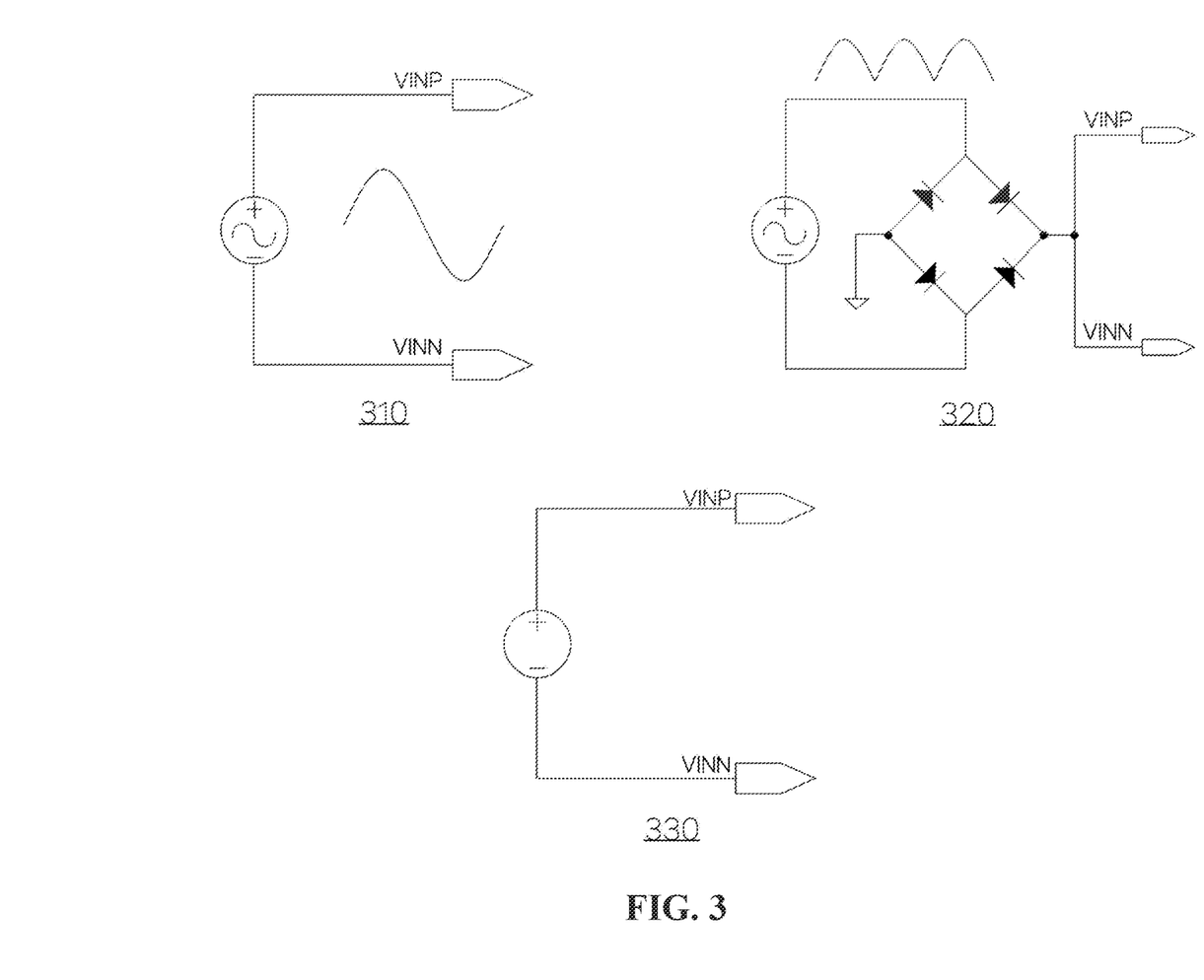
FIG. 3 is a circuit diagram showing input power stages of different types according to an embodiment of the present disclosure.

FIG. 3 is a circuit diagram showing input power stages (example: the input power stage 222) of different types according to an embodiment of the present disclosure. A first type of an input power stage 310 is an input power stage comprising alternating current power. A second type of an input power stage 320 is an input power stage comprising alternating current power and a rectifier. A third type of an input power stage 330 is an input power stage comprising direct current power. The type of an input power stage may be changed variously depending on an application in which a system (example: the system 200) is used.

Figure 4:
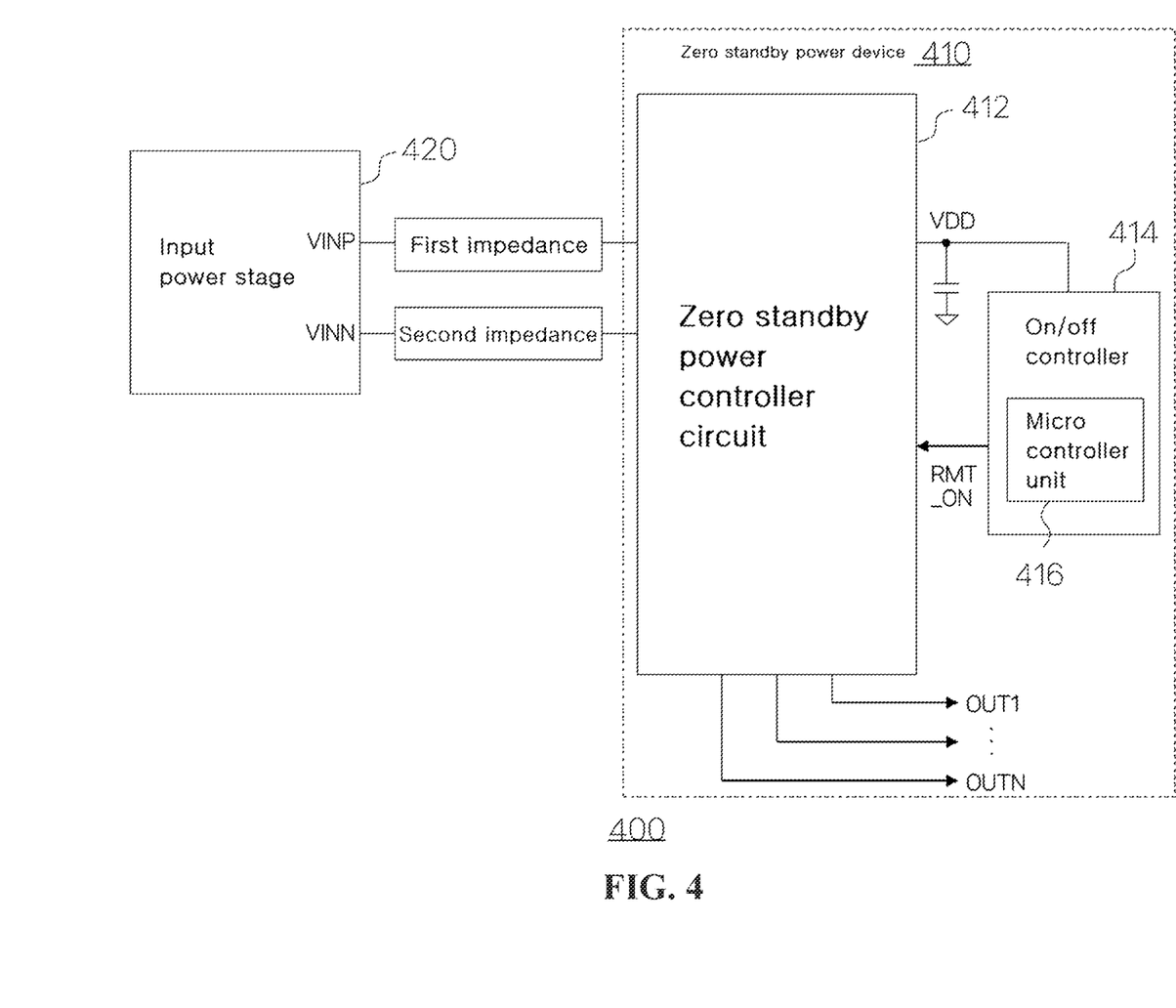
FIG. 4 is a block diagram of a zero standby power system for illustrating the operation by a wireless remote controller and/or a power switch according to an embodiment of the present disclosure.

FIG. 4 is a block diagram of a zero standby power system 400 for illustrating the operation by a wireless remote controller and/or a power switch according to an embodiment of the present disclosure. As illustrated, the system 400 may comprise a zero standby power device 410 and/or an input power stage 420. Here, the zero standby power device 410 and the input power stage 420 in FIG. 4 may respectively correspond to the zero standby power devices and the input power stages (or the input power source) in FIGS. 1 to 3.

The zero standby power device 410 may comprise a zero standby power controller circuit 412 and/or an on/off controller 414. Additionally, the on/off controller 414 may comprise a micro controller unit 416. Here, the zero standby power device 410 may form an electric power source VDD first by charging electric energy received from the input power stage 420.

The on/off controller 414 may be driven by receiving electric energy from the electric power source VDD. For example, the on/off controller 414 may receive an on/off signal from a wireless remote controller and/or a power switch through an IR receiver (not shown) connected to (or comprised in) the on/off controller 414. Then, the micro controller unit 416 may generate an RMT_ON signal based on the received on/off signal.

The on/off controller 414 may transmit the generated RMT_ON signal to the zero standby power controller circuit 412. In response to the reception of the RMT_ON signal, the zero standby power controller circuit 412 may output a signal (OUT1 to OUTN in this figure) for controlling connections respectively to a plurality of power stages (or a plurality of relay switches). In this way, a power supply device (example: the power supply device 130) connected with the zero standby power device 410 may be changed in an operation state.

Figure 5:
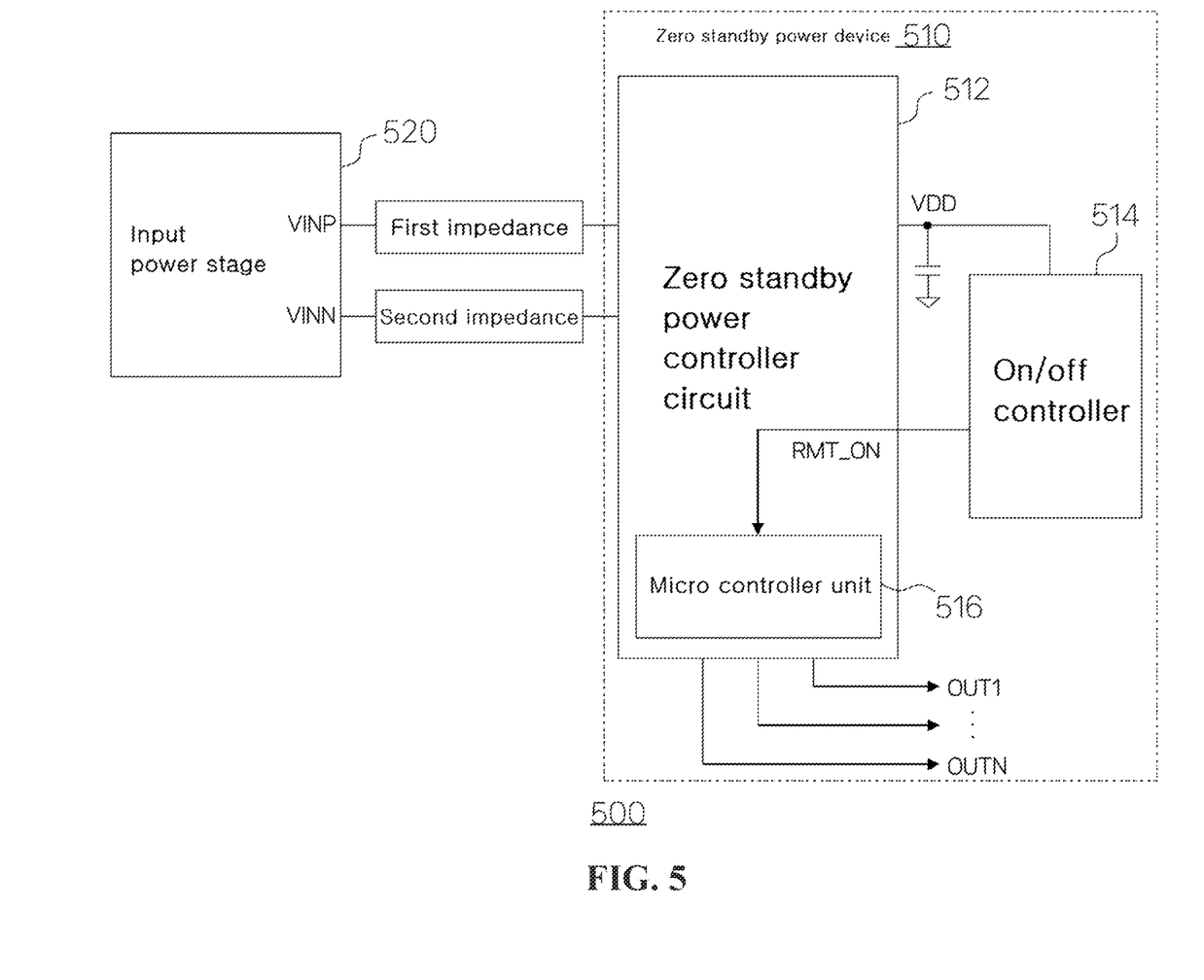
FIG. 5 is a block diagram showing another example of a zero standby power system for illustrating the operation by a wireless remote controller and/or a power switch according to an embodiment of the present disclosure.

FIG. 5 is a block diagram showing another example of a zero standby power system 500 for illustrating the operation by a wireless remote controller and/or a power switch according to an embodiment of the present disclosure. As illustrated, the system 500 may comprise a zero standby power device 510 and/or an input power stage 520. Here, the input power stage 520 of FIG. 5 may correspond to the input power stages (or the input power source) in FIGS. 1 to 3.

The zero standby power device 510 may comprise a zero standby power controller circuit 512 and/or an on/off controller 514. Additionally, the zero standby power controller circuit 512 may comprise a micro controller unit 516. The zero standby power device 510 may form an electric power source VDD first by charging electric energy received from the input power stage 520.

The on/off controller 514 may be driven by receiving electric energy from the electric power source VDD. For example, the on/off controller 514 may receive an on/off signal from a wireless remote controller and/or a power switch through an IR receiver (not shown) connected to (or comprised in) the on/off controller 514. The on/off controller 512 may generate an RMT_ON signal in response to the reception of the on/off signal.

The micro controller unit 516 may decode the received RMT_ON signal. Then, the micro controller unit 516 may output a signal (OUT1 to OUTN in this figure) for controlling connections respectively to a plurality of power stages (or a plurality of relay switches) based on a result of the decoding. In this way, a power supply device (example: the power supply device 130) connected with the zero standby power device 510 may be changed in an operation state.

Meanwhile, if the micro controller unit 516 is comprised in the zero standby power controller circuit 512 as shown in FIG. 5, the system 500 may take up an area smaller than that of the system 400 of FIG. 4. Additionally, the subject invention is not limited to a case where the system 500 of FIG. 5 and the system 400 of FIG. 4 exist separately as independent systems. For example, the system 500 and the system 400 may be implemented in one system.

Figure 6:
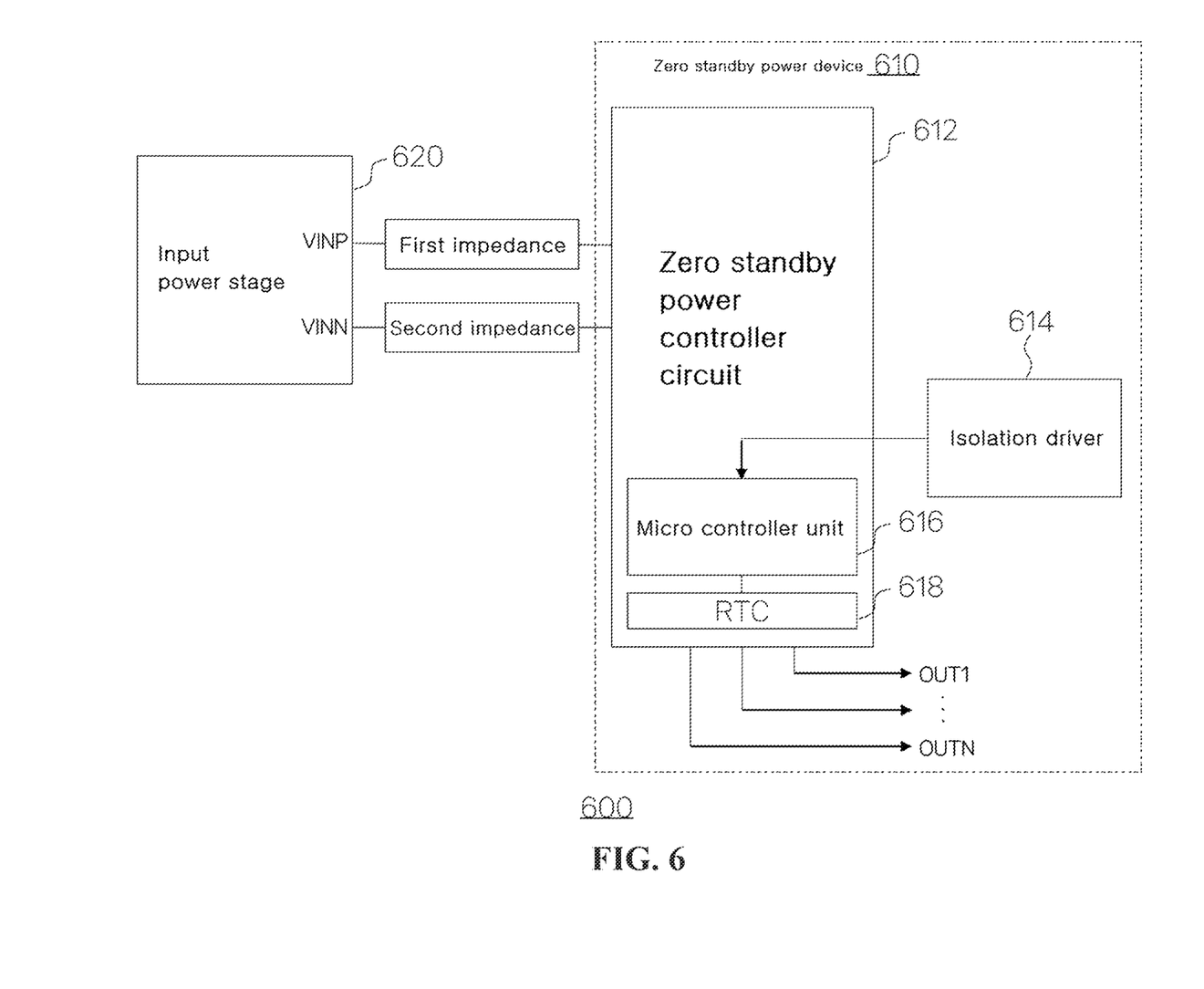
FIG. 6 is a block diagram of a zero standby power system for illustrating the operation by an isolation driver when a power supply device is not in an operation state according to an embodiment of the present disclosure.

FIG. 6 is a block diagram of a zero standby power system 600 for illustrating the operation by an isolation driver 614 when a power supply device (example: the power supply device 130) is not in an operation state according to an embodiment of the present disclosure. As illustrated, the system 600 may comprise a zero standby power device 610 and/or an input power stage 620. Here, the input power stage 620, the zero standby power controller circuit 612, and the isolation driver 614 in FIG. 6 may correspond respectively to the input power stages, the zero standby power controller circuits, and the isolation drivers shown in FIGS. 1 to 5. That is, the isolation driver 614 may be a driver prepared for transmitting a signal generated in the second side to the first side as the isolation driver 160 in FIG. 1.

As described above, when the power supply device connected to the system 600 is in an operation state, an on/off signal including wakeup timing information may be transmitted from an external device to a load controller (example: the load controller 140). Then, the load controller may transmit the on/off signal including wakeup timing information to a micro controller unit 616 again through the isolation driver 614. When a control signal generated by a real time clock 618 (RTC) based on the wakeup timing information is transmitted to the micro controller unit 616, the micro controller unit 616 may output a signal (OUT1 to OUTN in this figure) for controlling connections respectively to a plurality of power stages (or a plurality of relay switches). In this way, a power supply device (example: the power supply device 130) connected with the zero standby power device 610 may be changed in an operation state.

Figure 7:
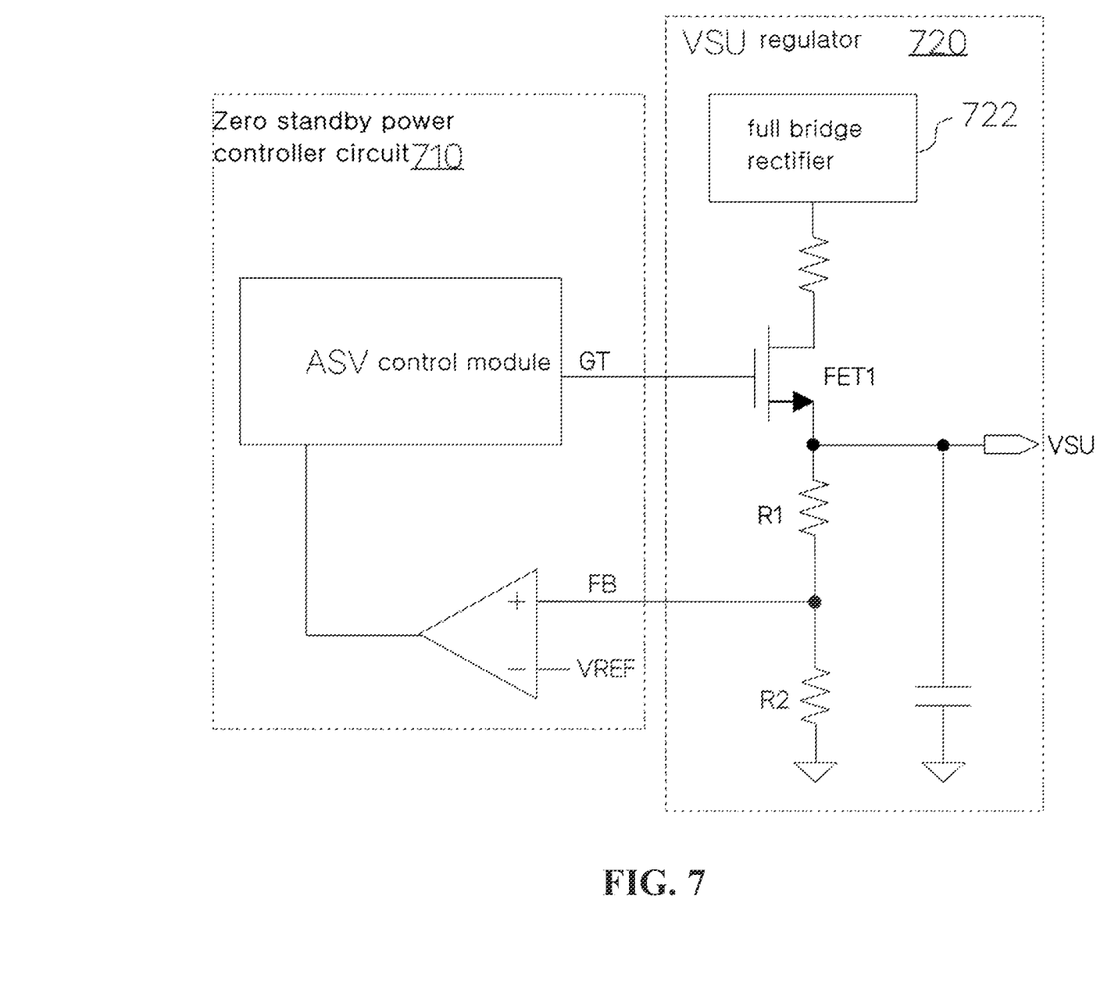
FIG. 7 is a block diagram for illustrating a normal operation mode of a VSU regulator according to an embodiment of the present disclosure.

FIG. 7 is a block diagram for illustrating a normal operation mode of a VSU regulator 720 according to an embodiment of the present disclosure. The VSU regulator 720 in a normal operation mode may control electrical connections of a zero standby power device (example: the zero standby power device 110) respectively to a plurality of power stages (example: the plurality of power stages 130_1 to 130_N) by using electric energy supplied from an input power source (example: the input power source 120). For example, in a case when each of the plurality of power stages is connected with the zero standby power device through each of a plurality of relay switches, the VSU regulator 720 may form power source VSU (voltage supply unit) for controlling the plurality of relay switches.

First, when alternating current and/or direct current electric energy from the input power source is supplied to the zero standby power device, the VSU regulator 720 may form a negative feedback voltage regulator including at least one transistor and/or at least one resistance by using the electric energy. For example, referring to FIG. 7, a zero standby power controller circuit 710 may regulate VSU power to have a predetermined level through an FB terminal. Here, a voltage of the VSU power may be changed to have another level by a closed-loop control using a reference voltage VREF in the zero standby power controller circuit 710 and a voltage of the FB terminal. Additionally, the level of the VSU power may be adjusted by changing external resistances R1 and/or R2. In this case, the voltage of the VSU power VSU may be represented by mathematical equation 1 as follows. Meanwhile, when input power to supply electric energy to the VSU regulator 720 is alternating current power, the VSU regulator 720 may comprise a full bridge rectifier 722.

$$VSU=VREF*(1+R1/R2) \qquad \text{Equation 1}$$

Figure 8:
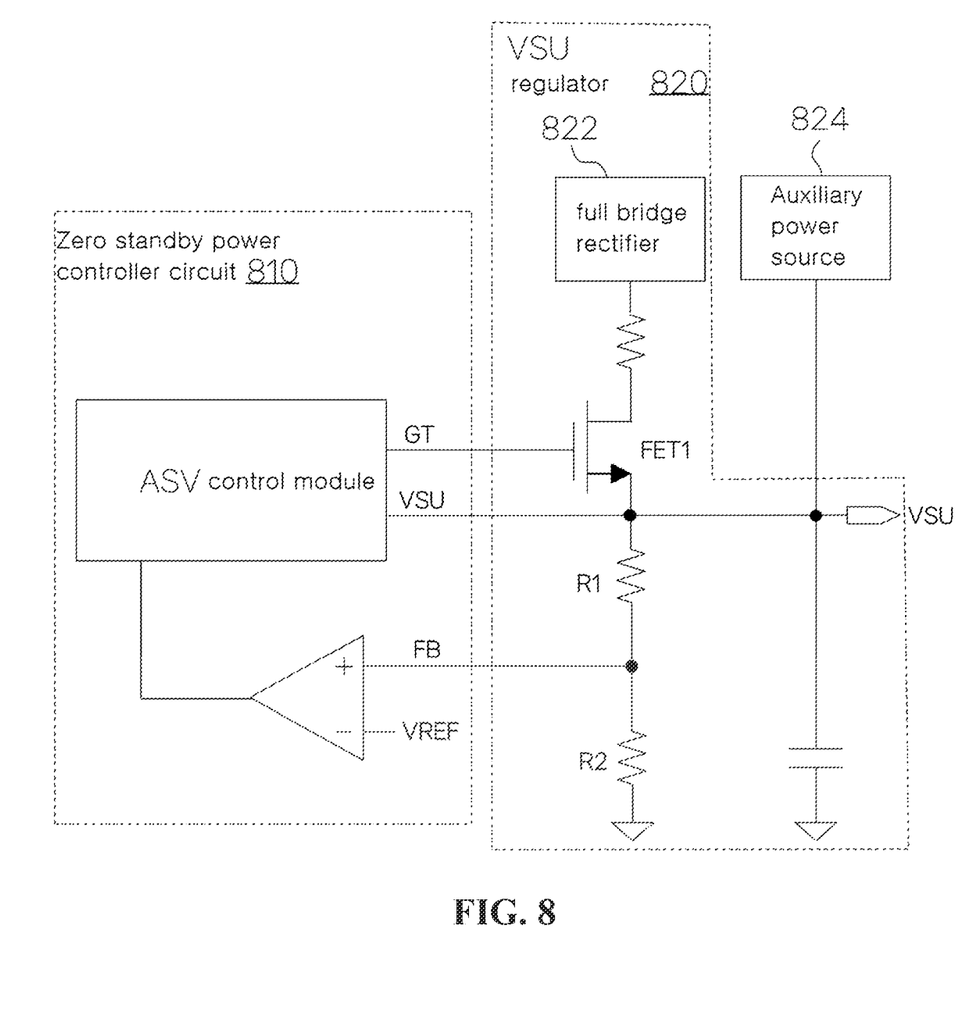
FIG. 8 is a block diagram for illustrating a power save mode of a VSU regulator according to an embodiment of the present disclosure.

FIG. 8 is a block diagram for illustrating a power save mode of a VSU regulator 820 according to an embodiment of the present disclosure. The VSU regulator 820 in a power save mode may reduce power consumed by the systems in FIGS. 1 to 6 by stopping the operation of the VSU regulator 820 based on a control algorithm stored in a zero standby power controller circuit 810 and using an auxiliary power source 824. Here, the auxiliary power source 824 may indicate a power source formed by a plurality of power stages when a power supply device (example: the power supply device 130) is in an operation state.

The zero standby power controller circuit 810 may sense a voltage VSU of a VSU power source. For example, when the level of a voltage of the auxiliary power source 824 formed by a plurality of power stages is higher than that of a voltage of the VSU power source, the zero standby power controller circuit 810 may change a source, from which electric energy is obtained, from the VSU regulator 820 to the auxiliary power source 824. Here, the electric energy may indicate energy used for controlling connections of a zero standby power device to the plurality of power stages.

Figure 9:
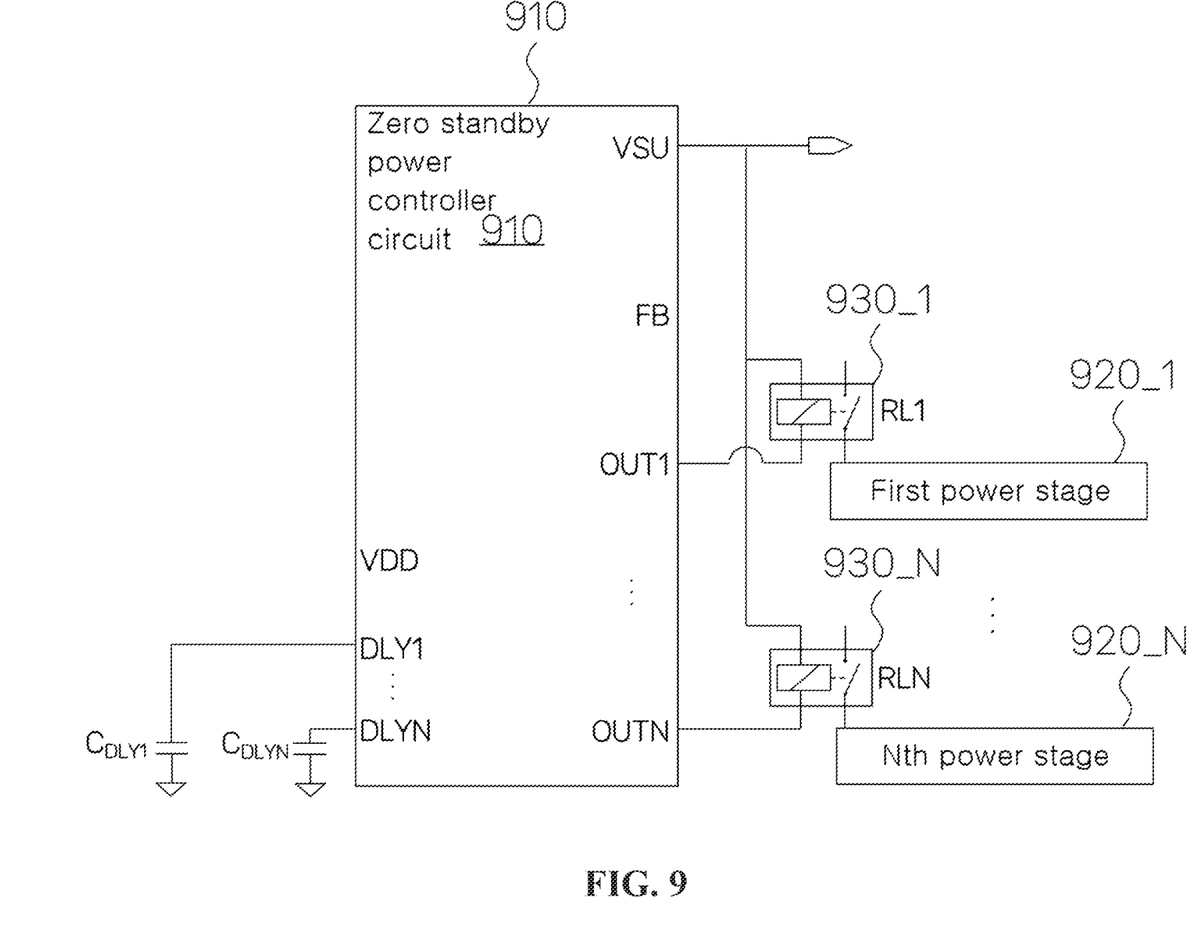
FIG. 9 is a block diagram for illustrating controls of a plurality of relay switches according to an embodiment of the present disclosure.

FIG. 9 is a block diagram for illustrating controls of a plurality of relay switches 930_1 to 930_N according to an embodiment of the present disclosure. A zero standby power controller circuit 910 may physically control electrical connections of the zero standby power controller circuit to a plurality of power stages 920_1 to 920_N by opening or closing (or short-circuiting) a plurality of relay switches 930_1 to 930_N.

Timings, when the plurality of relay switches 930_1 to 930_N are respectively opened or closed (or short-circuited), may be determined based on capacitances of capacitors CDLY1 to CDLYN corresponding respectively to the plurality of power stages 920_1 to 920_N. In this way, the plurality of relay switches 930_1 to 930_N may be sequentially opened or closed (or short-circuited) respectively at different timings.

Figure 10:
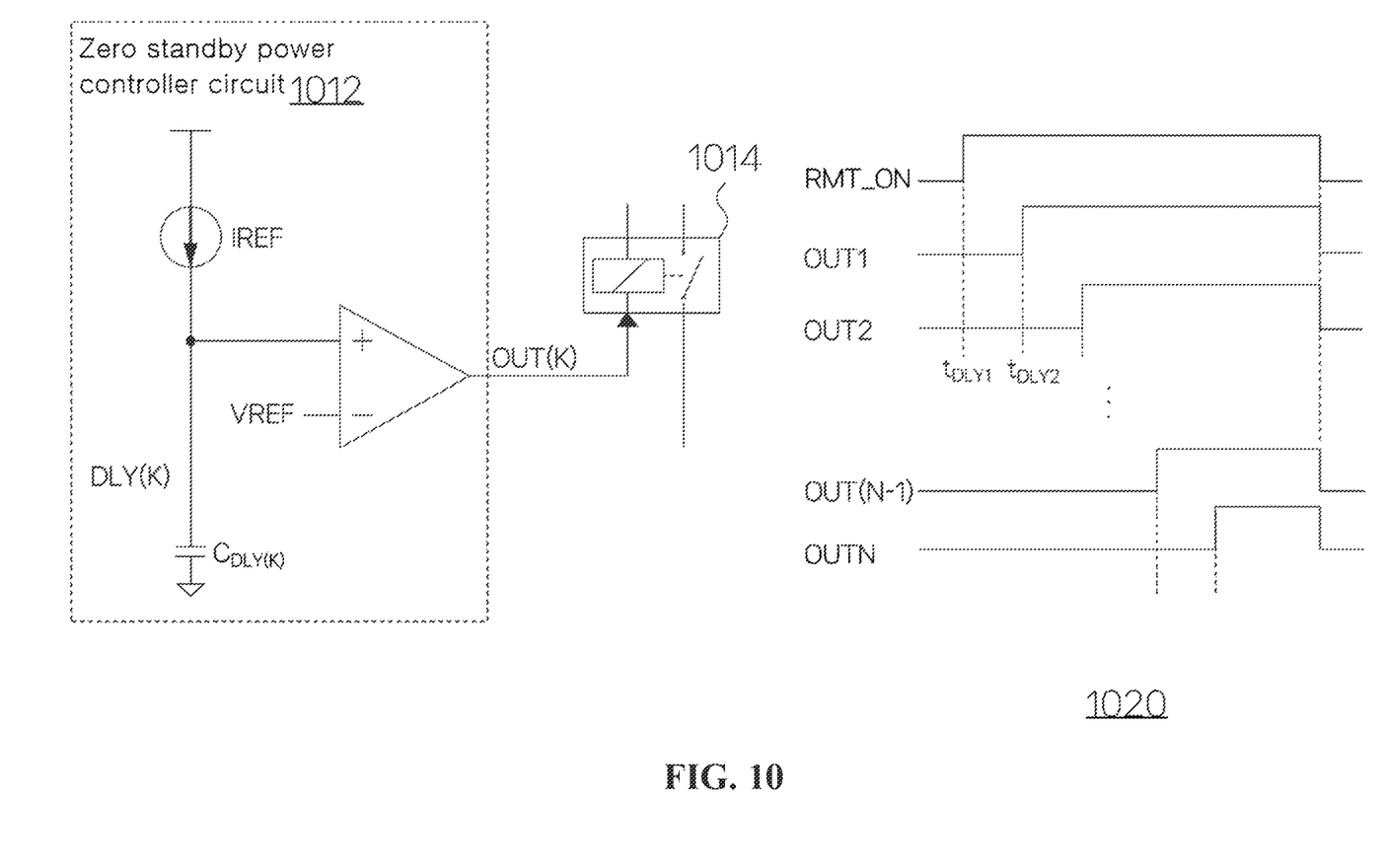
FIG. 10 is a graph for illustrating timings where relay switches are controlled according to an embodiment of the present disclosure.

FIG. 10 is a graph for illustrating a timing where a relay switch 1014 is controlled according to an embodiment of the present disclosure. As illustrated, a timing, where a signal for controlling the relay switch 1014 is generated from a zero standby power controller circuit 1012, may be determined by adjusting a reference voltage VREF and a reference current IREF in the zero standby power controller circuit 1012. Here, the relay switch 1014 may be a Kth relay switch among the plurality of relay switches 930_1 to 930_N. A timing, where a signal OUT(K) for controlling the Kth relay switch is generated, may be represented by mathematical equation 2 as follows.

$$t_{DLY(K)} = (C_{DLY(K)} * VREF)/IREF \text{ [sec]} \qquad \text{Equation 2}$$

Figure 11:
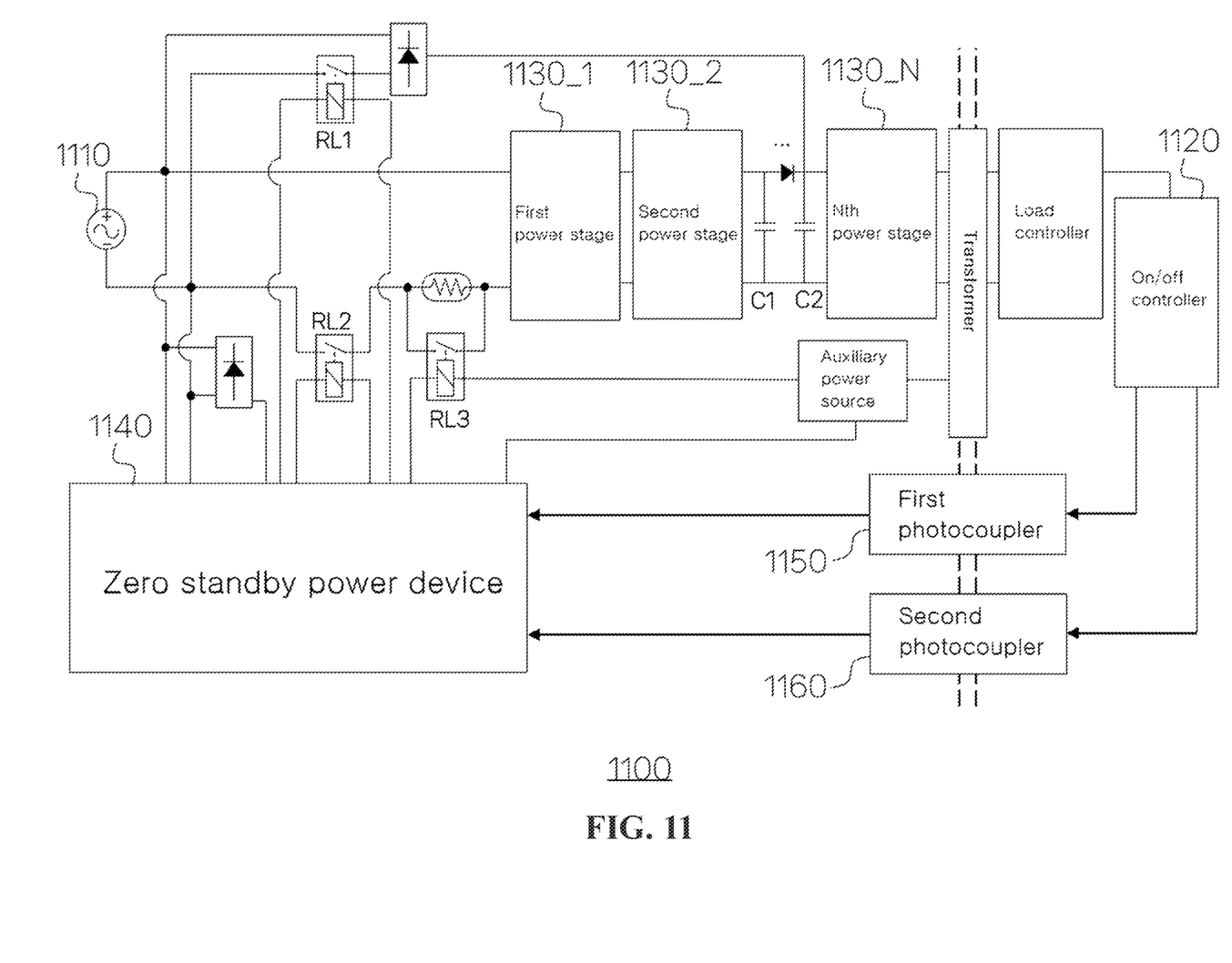
FIG. 11 is a block diagram showing an additional example of a zero standby power system according to an embodiment of the present disclosure.

FIG. 11 is a block diagram showing an additional example of a zero standby power system 1100 according to an embodiment of the present disclosure. In the system 1100, unlike in the systems illustrated in FIGS. 1 to 10, an on/off controller 1120 may be disposed in a second side. That is, the system 1100 may be implemented by using existing components in which the on/off controller 1120 is disposed in the second side without adding an on/off controller to a first side.

Referring to FIG. 11, when input power 1110 is applied, a first relay switch RL1 may be changed to be in an on state and charge a capacitor C2 prepared for supplying power to an Nth power stage 1130_N. That is, only by the operation of the Nth power stage 1130_N in the first side, electric energy for controlling the on/off controller 1120 may be obtained. Additionally, in order that a predetermined level of a voltage, at which the on/off controller 1120 may operate, may be maintained for reduction of standby power, the on/off controller 1120 may generate a signal for turning off the first relay switch RL1 and control the first relay switch RL1 such that the first relay switch RL1 is repeatedly turned on/off through a first photocoupler 1150 and/or a second photocoupler 1160. Then, when the predetermined level of a voltage becomes lower as the capacitor C2 is discharged, the on/off controller 1120 may generate a signal for turning on the first relay switch RL1 in order to re-charge the capacitor C2 and the zero standby power device 1140 may control the first relay switch to be turned on by the first photocoupler 1150 and/or the second photocoupler 1160.

The above descriptions of the present disclosure are provided to enable persons skilled in the art to implement or use the present disclosure. Various modified examples of the present disclosure will be obvious to persons skilled in the art and general principles defined in this application may be applied to the various modified examples without being beyond the purpose or the scope of the present disclosure. Therefore, the present disclosure is not intended to be limited to the examples described in this application, but it is intended to have the widest scope consistent with the principles and new features disclosed in this application.

It is noted that, although the present disclosure is described with respect to some embodiments in this specification, various modifications and changes can be made within the scope of the present disclosure that a person skilled in the art, to which the subject invention pertains, would understand. In addition, such modifications and changes should be considered to be within the scope of the invention of the claims attached to this specification.

What is claimed is:

1. A zero standby power system, comprising:
   a power supply device comprising a plurality of power stages and disposed in a first side of a transformer;
   a capacitor configured to supply electric power to one of the plurality of power stages;
   an on/off controller disposed in a second side of the transformer and configured to receive an on/off signal from an external device; and
   a zero standby power device configured to receive the on/off signal and to control connections respectively to the plurality of power stages based on the receive on/off signal,
   wherein, when input power is applied, a relay switch is changed to be in an on state to charge the capacitor,
   wherein the on/off controller is configured to obtain electric energy based on an operation of the one of the plurality of power stages and generates a signal for changing the relay switch to be in an off state and controls the relay switch to be repeatedly turned on and off through at least one photocoupler in order that a voltage for the on/off controller is maintained to have a predetermined level, and
   wherein, when the capacitor has been discharged, the on/off controller generates a signal for changing the relay switch to be in the on state and controls the relay switch to be changed to be in the on state through the at least one photocoupler so that the capacitor can be re-charged.

2. The zero standby power system of claim 1, wherein the zero standby power device controls a connection to an input power source based on the on/off signal so that electric power from the input power source is transferred respectively to the plurality of power stages.

3. The zero standby power system of claim 2, wherein the input power source comprises at least one of an alternating current line power source or a direct current power source, wherein, in a case when the input power source is an alternating current line power source, the zero standby power device is supplied with electric energy through a rectifier.

4. The zero standby power system of claim 1, wherein the zero standby power device further comprises a zero standby power controller circuit and the on/off controller comprises a first micro controller unit (MCU) to receive the on/off signal from a wireless remote controller.

5. The zero standby power system of claim 1, wherein, in response to the reception of the on/off signal, the on/off controller transmits an RMT_ON signal, which is a basis of controlling connections respectively to a plurality of power stages, to the zero standby power controller circuit and the zero standby power device further comprises a second micro controller unit to receive the RMT_ON signal.

6. The zero standby power system of claim 5, further comprising:
   a load, which is driven by electric energy transmitted from the power supply device through the transformer; and
   an isolation driver connected with the transformer, and
   wherein the on/off signal is transmitted to the zero standby power device through the isolation driver.

7. The zero standby power system of claim 6, further comprising:
   a load controller to control operation of the load,
   wherein the zero standby power device further comprises a zero standby power controller circuit, wherein the zero standby power controller circuit receives the on/off signal including wakeup timing information from the load controller through the isolation driver.

8. The zero standby power system of claim 7, wherein the zero standby power controller circuit further comprises a real time clock (RTC) and a third micro controller unit to receive the on/off signal including wakeup timing information, and wherein the zero standby power controller circuit controls connections respectively to the plurality of power stages at a predetermined time point according to the wakeup timing information.

9. The zero standby power system of claim 1, wherein the zero standby power device further comprises a VSU regulator to obtain electric energy used for controlling connections to the zero standby power controller circuit and respectively to the plurality of power stages.

10. The zero standby power system of claim 9, wherein, when the VSU regulator is in a normal operation mode, VSU power in the VSU regulator associated with electric power is regulated to be a voltage with a predetermined level by the zero standby power controller circuit, wherein the voltage with a predetermined level is determined based on at least one of a resistance in the VSU regulator and a reference voltage in the zero standby power controller circuit.

11. The zero standby power system of claim 9, wherein, in a case when the plurality of power stages are in an operation state by the control of the zero standby power device, an auxiliary power source is formed by the plurality of power stages and, when a voltage of VSU power in the VSU regulator is lower than a voltage of the auxiliary power source, the zero standby power controller circuit changes a source, from which electric energy is obtained, from the VSU regulator to the auxiliary power source.

12. The zero standby power system of claim 9, wherein the zero standby power device further comprises a zero standby power controller circuit and a timing, where each of the plurality of power stages is changed to be in an operation state, is determined based on at least one of one or more capacitors connected to the zero standby power controller circuit, input of a reference into the zero standby power controller circuit and at least one of reference voltages.

\* \* \* \* \*